Sept. 26, 1961    SHOZO ISHIOKA ET AL    3,001,455
AUTOMATIC BEVEL GEAR TOOTH GENERATING MACHINE
Filed Feb. 27, 1959    4 Sheets-Sheet 1

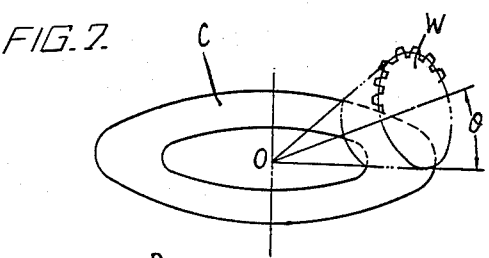
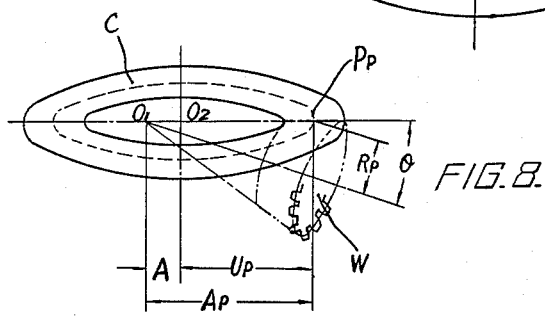
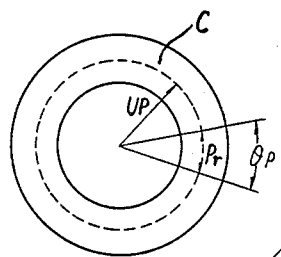
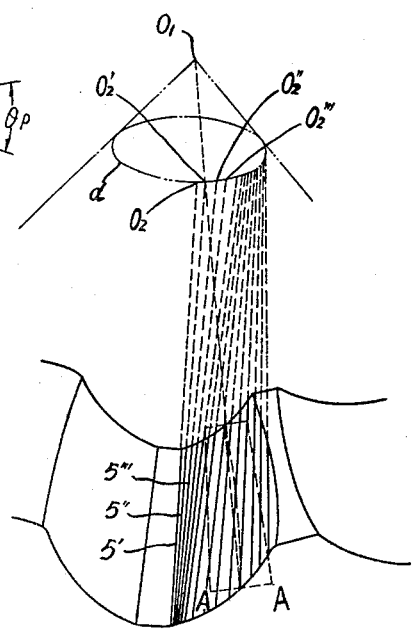

3,001,455
AUTOMATIC BEVEL GEAR TOOTH
GENERATING MACHINE
Shozo Ishioka, Genjiro Matsumoto, and Masamoto Akeyama, Tokyo, Japan, assignors to Hitachi Limited, Tokyo, Japan
Filed Feb. 27, 1959, Ser. No. 795,937
2 Claims. (Cl. 90—3)

This invention relates to an automatic machine for cutting or grinding teeth of a bevel gear wheel, and more particularly the tooth having a crowning along the direction of tooth flank.

The principal object of this invention is to provide an automatic bevel gear tooth cutting and grinding machine which can operate continuously without a special indexing mechanism.

Another object of this invention is to provide an automatic machine for cutting and grinding bevel gear teeth having a crowning along the direction of gear flank.

A further object of this invention is to provided such a machine having two cutting heads enabling to cut a crowned bevel pinion and a crowned bevel wheel interchangeably or alternately and adapted for effecting the meshing test of the finished bevel pinion and bevel wheel on the same machine.

A still further object of this invention is to provide an automatic gear cutting machine for cutting helical teeth of a bevel pinion and wheel having a crowning along the direction of gear flank.

In a well known gear cutting machine, wherein teeth are generated by intermittent indexing of a face mill type annular cutter, the cutting operation is not carried out continuously so that it is difficult to obtain the highest efficiency.

Moreover it is very difficult to obtain crowned teeth by continuous gear cutting operations.

The above disadvantages can be obviated by the present invention and the gear cutting machine embodying this invention does not require intermittent indexing, even though it employs a face mill type annular cutter or grinder, and it comprises means for shifting the apex of the conical surface of a bevel wheel to be cut out of the center of the pitch disk of an imaginary crown gear on the plane containing a conical edge of said bevel wheel keeping said conical edge of the pitch cone of the bevel wheel to be cut in contact with the pitch disk of said imaginary crown gear, means for revolving a blank to be worked on its own supporting shaft, means for rotating said blank around the surface of pitch disc of the imaginary crown gear and means for revolving and feeding a cutting tool which is a part of said imaginary crown gear, thereby generating a tooth of the bevel gear having some crowning along the direction of tooth flank.

In an embodiment of this invention, two sets of similar arrangements are provided for cutting a bevel pinion and a bevel wheel for a single machine with a common change gear mechanism interchangeably engaged between either one of the two sets of arrangements for facilitating to work a bevel pinion at one time and then shifting the common change gear mechanism to engage the driving gearing of the bevel wheel cutting device to cut teeth of the bevel wheel. With such an arrangement, a bevel pinion and a bevel wheel can not only be worked alternately with higher efficiency in a single machine, but also after the pinion and gear are cut they can be meshed with each other on the machine and run for meshing test to inspect the teeth contact by attaching some simple means as hereinafter explained.

In another embodiment of this invention, provision is made for shifting the tool stock crosswise to the right or left relative to the work so as to cut right hand or left hand helical teeth with some crowning along the direction of tooth flank.

For a better understanding of this invention, reference is made to the accompanying drawings, in which FIG. 1 is a sectional view of the main operating parts of the bevel gear cutting machine embodying this invention;

FIG. 1-*a* is a section taken on the line A—A of FIG. 1;

FIG. 7 is a diagrammatic view for illustrating the principle of an ordinary method of generating bevel gear teeth;

FIG. 8 is a diagrammatic view for illustrating the principle of the gear cutting method carried out by the machine of this invention;

FIG. 9 is an explanatory diagram for the explanation of the method;

FIG. 10 is also a diagram for illustrating the principle of cutting crowned bevel gear teeth by the machine of this invention.

Figure 1:
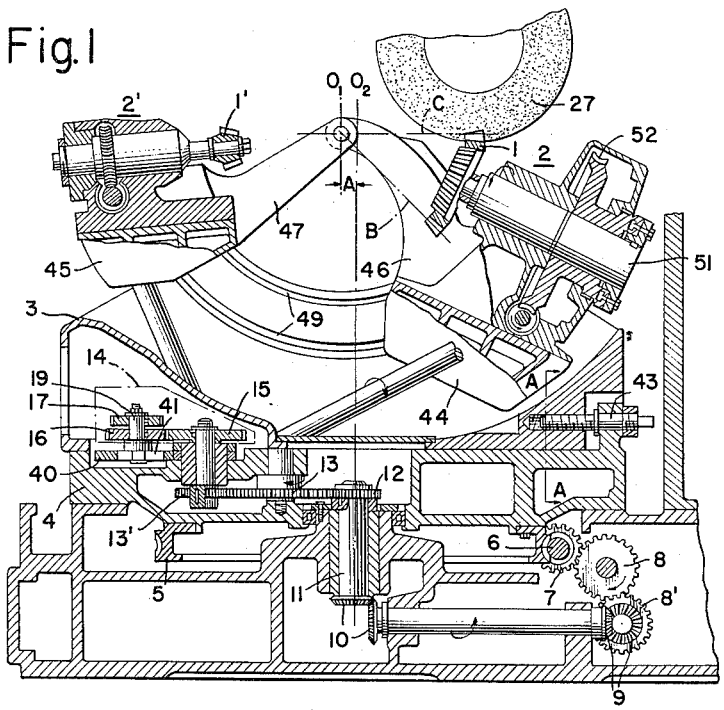

Referring to FIGS. 1 to 5, reference numeral 1 represents a bevel gear blank of which teeth are to be cut, 2 is a mounting head of the blank 1 enclosing its rotating mechanism, 3 a base for mounting the blank head 2, and 4 a table for supporting the base 3 and for revolving it around the central axis by means of a worm wheel 5 and a worm 6 which is driven by the gears 7, 8 and 8′ (FIG. 1) from the driven source (not shown).

The power is transmitted from the driving pinions 8, 8′ to the bevel gearing 9, then through the gearing 10 to the central shaft 11, from which through the gears 12, 13 and 13′ to a series of change gear 14, i.e. to the gear wheels 15, 16, 17, 18, 18′, 19, bevel gears 20, 21, 22 and 23, 24, and worm 25 and worm wheel 26, then to the work 1, thus the latter is rotated about its main spindle.

Reference numeral 27 (FIGS. 1, 4 and 5) represents a pair of cutters for cutting the right and left tooth surfaces and arranged radially from the central position of the imaginary crown gear, 28 represents a casing or head including means for supporting and driving the cutter, and 29 a ram for mounting the casing 28 and driving gears of the cutter 27 adapted to be reciprocated alternately to the right and left along a straight line passing through the tooth flank from the center of the imaginary crown gear (center of table), 30 is a guide plate for the ram 29 facilitating to off-set the latter to the right or left about the supporting axis 31 according to the tooth angle of the bevel wheel, 32 a cross slide for mounting the guide plates 30, and 33 (FIGS. 4 and 5) a table for supporting the cross slide 32 and all parts thereon adapted to tilt the table 33 about the pivot 35 corresponding to the tooth bottom angle of the bevel gear to be worked. The tilting of the table 33 is effected by means of a segment gear 36 and a pinion 37.

The cross slide 32 engages a screw spindle 38 secured to the table 33 (FIGS. 4 and 5) and is shifted together with 27, 28 and 29 mounted thereon to and fro by turning the screw spindle 38 so that the cutter 27 can be shifted to the offset position from the center of the imaginary crown gear enabling to cut right or left hand twisted helical teeth of bevel gears. The machine frame 39 involves a driving motor and power transmission gearing therein (not shown).

In an embodiment of this invention shown in FIGS. 1, 4 and 5, two sets of similar rotating mechanisms 2 and 2' are mounted on the same table for cutting the bevel wheel 1 and pinion 1' alternately for the advantageous purpose as hereinafter described. The same or similar parts to 2 of the second set 2' are shown by the same reference numerals with " ' ". For cutting a bevel pinion and wheel alternately, the change gear unit 14 (FIGS. 1 to 3) is arranged interchangeably from the gear train for driving the wheel blank to that for the pinion blank. For instance, the change gear unit 14 is mounted a pivoted slide bar 40 to be turned from the position engaging the gear train for driving the bevel wheel blank to the position as shown in FIG. 2 for driving the bevel pinion blank. The bar 40 is preferably provided with a slot 41 to receive the gear shaft in adjustable condition for selecting the gear ratio.

The base 3 is mounted on the base table 4 to slide along a cotter 42 fixed to or integral with the table 4 by turning a screw spindle 43, thus the apex of pitch cone of the bevel gear to be worked being shifted out of center of the driving table along the line including a side edge of the cone making a tangent to the pitch surface of the imaginary crown gear.

Figure 2:
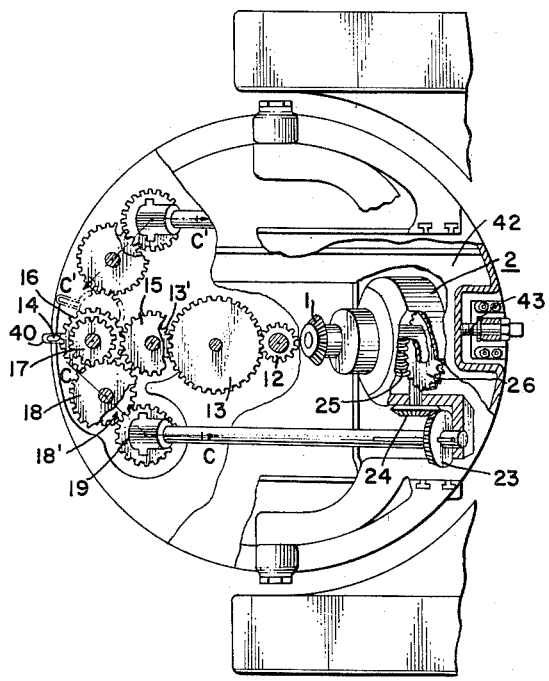
FIG. 2 is a plan view of the gearing arranged on the machine base.
Figure 1A:
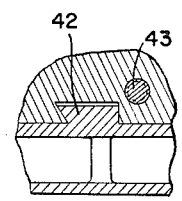

Referring to FIG. 1, the bevel wheel blank to be cut is shown by 1 and is secured to the end of its revolving shaft. The apex $O_1$ of the pitch cone including the side edge B of the bevel wheel which was originally located at the point $O_2$ is shifted for the amount A to the point $O_1$ on the central axis of the table 4 and on one side edge C of the pitch cone which is tangent to the pitch disk of the imaginary crown gear.

Figure 4:
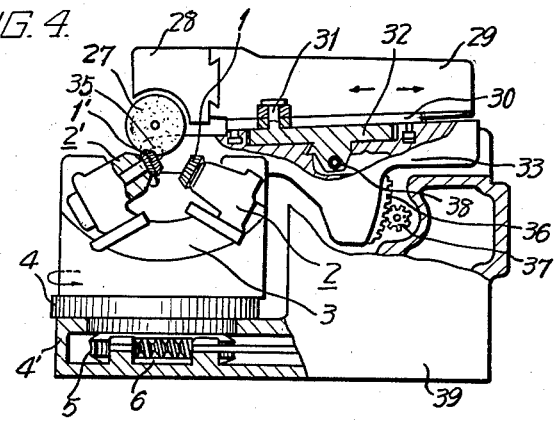
FIG. 4 is a partial sectional elevation of the gear cutting machine shown in FIG. 1.
Figure 5:
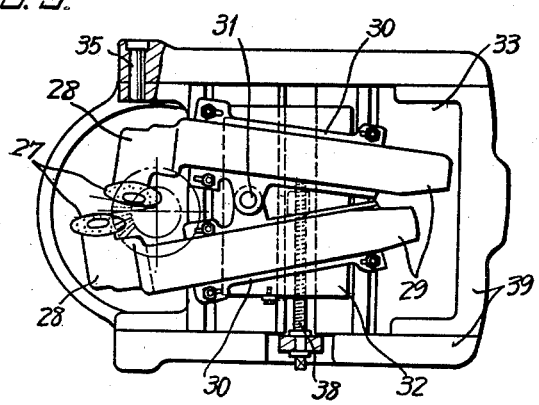
FIG. 5 is its diagrammatic plan view.

As apparent from the foregoing description and more particularly from FIGS. 1 and 4, the bevel wheel blank 1 to be worked is mounted on the machine with the apex of its pitch cone shifted for the distance A from the center of table 4 beyond the center of imaginary crown gear in the case of FIG. 1 (but it can be shifted to the right side) and is rotated on its own supporting axis while revolving on the table 4 and at the same time the tooth surface of the bevel gear is generated by the cutter 27 which is a part of the imaginary crown gear. By this means, the machine of this invention enables to cut bevel gear teeth having some crowning along the direction of tooth flank automatically and continuously without any other special attachment as an indexing means. The reason why such crowned bevel gear teeth can be generated by shifting the apex of the pitch cone of the bevel blank to be cut as above will be explained hereafter.

The bevel gear having crowned teeth makes local contacts instead of line contact as in an ordinary spur gear and is not so sensitive to the effect of errors resulting from the gear cutting and fitting etc. and has advantages of preventing one side contact of teeth. This is due to the fact that though it is theoretically desirous to obtain a line contact between teeth of the bevel gears as in spur gearing, yet it is practically impossible to obtain such theoretical meshing condition by various errors occurring during the gear cutting, mounting and running. Consequently the crowned bevel teeth are utilized advantageously.

Figure 6:
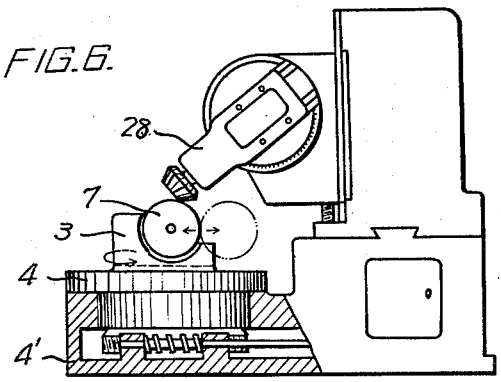
FIG. 6 is a partial sectional elevation of a modified embodiment of this invention.

As another embodiment of this invention, the cutter and the work may be arranged in inverse relation as shown in FIG. 6, wherein the cutter 7 is mounted on the revolving head instead of the gear blank in FIG. 1 and the gear blank is mounted on the cutter head so as to effect the same relative operations.

Now the principle of self-indexing and continuous gear generating operation as attained by shifting the apex of the bevel blank to be cut as above explained in the machine of this invention without necessitating other indexing mechanism or without interrupting continuous operation will be explained.

In considering the theory relating to bevel gears and the method of generating teeth it is usual to assume an imaginary crown gear C (FIG. 7), on which the pitch cone of the bevel gear W makes rolling contact motion having the apexes of the two pitch cones of the bevel pinion and gear at the same point O.

The cutting edge of the imaginary crown gear is realized by the movement of a cutter or grinder, but the angle on the pitch disk of the imaginary crown gear corresponding to one circular pitch of the teeth to be cut does not always divide the total circumference, 360°, of the crown gear into a round number, and it is rather very seldom that the circumference can be divided into an integral number. Thus when the cutter completes the cutting of one tooth flank it should be shifted out of the working position, and meanwhile the blank should be indexed for the next tooth. Thus the working condition in the known gear cutting process is intermittent as above explained and it is different from such a continuous working system for cutting teeth on the total circumference by revolving a cutter or gear blank as in hob cutter for spur gears and helical gears.

On the other hand, in the method of gear cutting with the machine of this invention the apex of the pitch cone of the gear blank is shifted (FIG. 8) from the center $O_2$ of the imaginary crown gear and a suitable rotary motion is given to both of them at a suitable relative angular velocity and teeth of bevel gears are cut by using a suitable cutter or grinder corresponding to the tooth profile of the crown gear.

The tooth profile of the bevel pinion and gear thus cut has some crowning along the direction of the tooth flank, and the gear to be cut and the pitch surface of the imaginary crown gear effect the rolling contact at this point of crowning so that by suitably selecting the amount of shift of the apex of the pitch cone of the bevel gear to be cut and the position of crowning the angle $\theta$ on the pitch disk of the crown gear for one circular pitch $p$ of the bevel gear to be cut at this rolling position can be taken just to divide the total circumference, 360°, of the crown gear into a round number.

Assuming now the rotary angular velocities of the pitch cone of the bevel pinion to be cut and that of the pitch disk of the imaginary crown gear to be $\omega_p$ and $\omega$ respectively and the pitch angle of the bevel pinion to be cut is $\theta$, then there establishes the following relation:

$$\omega_p = \frac{k_p}{\sin \theta} \omega \qquad (1)$$

wherein $k_p$ is a suitable positive constant which is called as "rolling factor."

FIG. 8 illustrates the condition when the apex $O_1$ of the bevel wheel W to be cut is shifted for the amount of A to the left of the center $O_2$ of the imaginary crown gear C, on which the conical surface of bevel pinion $p$ makes rolling contact with the pitch disk of the imaginary crown gear according to the method of gear cutting in the machine of this invention.

$P_p$ designates a rolling point which is a top of crowning of the tooth surface where the pinion and the pitch surface of the imaginary gear make rolling contact and they do not make rolling contact at other position except this point.

$R_p$ represents the radius of the pitch circle of the pinion to be cut through the rolling point.

A represents the amount of shift denoted by the ± sign and it is negative in case of FIG. 8.

If the number of teeth of the pinion is $N_p$, then the rolling circular pitch $P_r$ measured on the rolling pitch circle having the radius $R_p$ is given by the following equation:

$$P_r = \frac{2\pi R_p}{N_p} \qquad (2)$$

This value takes the same amount if it is measured on the rolling pitch circle of the imaginary crown gear.

Therefore if the central angle on the pitch disk of the imaginary crown gear corresponding to the pitch $P_r$ is $\theta_p$ radians as shown in FIG. 9, then it is given by the following equation:

$$\theta_p = \frac{P_r}{U_p} = \frac{2\pi R_p}{N_p U_p} \quad (3)$$

If the rolling factor is expressed by $k_p$, then $$k_p = \frac{U_p}{A_p} = \frac{U_p}{U_p - A} = \frac{U_p}{R_p} \sin\theta \quad (4)$$

By substituting this into the Equation 3, $\theta_p$ will become $$\theta_p = \frac{2\pi \sin\theta}{N_p k_p} \quad (5)$$

$$\frac{2\pi}{\theta_p} = \frac{N_p}{\sin\theta} k_p = \text{integer } n_p \quad (6)$$

This means that it is necessary to select the value of $$\frac{2\pi}{\theta_p}$$

to be an integer.

Accordingly at the first step a suitable integral number is selected for $n_p$ and the rolling factor $k_p$ is determined for this value of $n_p$ by the following equation:

$$k_p = n_p \frac{\sin\theta}{N_p} \quad (7)$$

Then the amount of shift A and the rolling radius $U_p$ of the imaginary crown gear are selected to satisfy the following relation:

$$\frac{U_p}{U_p - A} = k_p \quad (8)$$

The foregoing relation is described about the bevel pinion, and in case of the bevel wheel the above value can be determined in the similar manner.

It is necessary that the value of the integer $n_p$ ($n_g$ in case of bevel wheel) should be prime to the number of teeth of pinion, $N_p$ and gear, $N_g$ respectively so as to prevent the overlapped cutting the same tooth surface during the cutting operation. It is apparent that with the gear as set above, every one, two or more teeth are cut successively until the total teeth are cut by the revolutions of the table for the total number of teeth.

In addition to the self-indexing and continuous operating feature of the bevel gear generating machine of this invention, the tooth having some crowning along the direction of tooth flank can be obtained as above described. The reason why such crowned teeth can be generated by the present gear generating machine is based on shifting the apex $O_1$ (refer to FIG. 1) of the bevel gear blank to be cut with respect to the center $O_2$ of the imaginary crown gear and is due to the fact that the bevel gear blank or cutter is rotated on its own supporting axis while either one of them is revolved around the central axis of the imaginary crown gear maintaining respective angular velocities at a constant ratio. Thus in cutting teeth, the apex $O_1$ of the pitch cone of the bevel gear blank to be cut, which makes contact with the center $O_2$ of the imaginary crown gear, as shown in FIG. 10 is shifted successively to $O_2'$, $O_2''$, $O_2'''$ . . . so that their locus traces a circle $d$ on the surface of pitch cone of the bevel gear blank. In other words, the center $O_2$ (FIG. 1) of the pitch disk C on the pitch surface B is shifted successively along the circumference $d$ as shown in FIG. 10 so that the envelope to be cut is directed to different points $O_2'$, $O_2''$, $O_2'''$ . . . on the circle $d$ respectively and has the slope as shown by $5'$, $5''$, $5'''$ . . . with respect to the direction of tooth flank, thereby forming a crowning in the section A—A as shown.

On the contrary, in heretofore known gear generating method the apexes of the pitch cone of bevel gears to be cut and the center of the imaginary crown gear are made to coincide with each other at one point so that the tooth surface to be generated consists of a series of successively cut surfaces, each of which concentrating at a point, thereby forming the tooth surface making line contact theoretically, but no crowning is formed.

Figure 3:
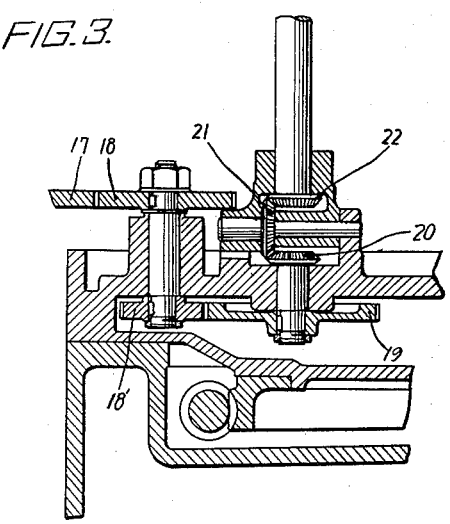
FIG. 3 is a sectional elevation taken on the line C—C or C′—C′ of FIG. 2.
Figure 11:
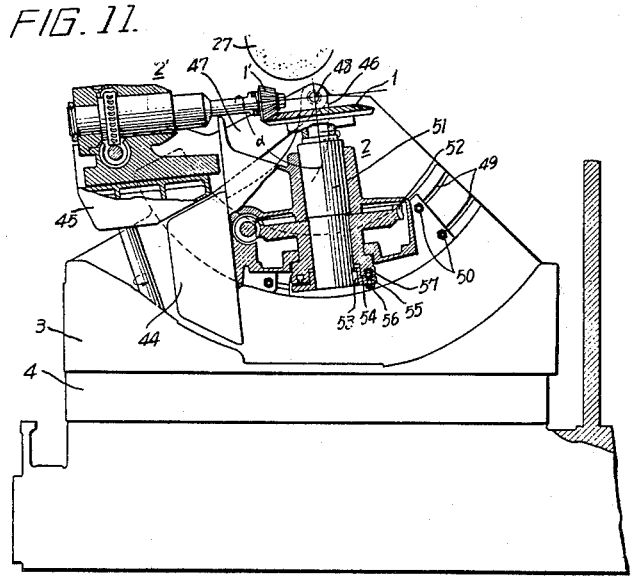
FIG. 11 is a partial sectional elevation showing the arrangement for effecting meshing test of the cut gears in this machine.

FIG. 11 shows the arrangement of effecting the meshing test of finished gear teeth in the machine of this invention as shown in FIGS. 1–3. For this purpose, the supporting frames 44 and 45 of the bevel wheel head 2 and bevel pinion head 2' respectively are provided with projecting arms 46 and 47 which are joined together at a pivot 48 which coincides with the apexes of pitch cones of bevel pinion and bevel gear to be cut, and guide ways 49 along the circular arc with the center at 48 are provided for the table 3 to allow either one of the frame 44 or 45 to be moved along the circular arc around the pivot 48 as the center and clamped at position corresponding to the sum of pitch angles $\alpha$ by means of clamping bolts 50. Means is provided for releasing the spindle 51 of the bevel wheel 1 from its driving gear, i.e. the worm wheel 52 which is secured to the spindle 51 by means of a key 53 fixed to the gland 54 which is secured to the boss of the worm wheel 52 by means of bolts 55 engaging a circular groove 57 provided in the boss. Thus if the nut 56 is unscrewed the spindle 51 can be released from the worm wheel 52 so that the bevel wheel 1 fixed to the spindle 51 can be driven freely from the pinion 1' which may be driven by the operating mechanism of the machine. Thus the meshing test of cut gears 1 and 1' can be effected as usual.

What we claim is:

1. An automatic self-indexing continuously operating bevel gear generating machine for processing a bevel gear blank including a supporting shaft and having a pitch cone with an apex, said machine comprising a table, a base slidingly engaging said table for movement along a straight line, first means arranged on said table for rotating said bevel gear blank on said supporting shaft, said first means being mounted on said base, second means including and adapted for moving a cutter in predetermined relation with respect to said bevel gear blank, a stationary base supporting said table, third means arranged on said stationary base for rotating said first means with respect to said second means around a central axis defined by said table, and means for shifting said slidable base with respect to said table along a straight line, and thereby shifting the apex of the pitch cone of the bevel gear blank from the center of an imaginary crown gear on a straight line containing one side edge of the pitch cone of the bevel gear blank while maintaining the said imaginary crown gear in stationary condition.

2. A machine according to claim 1, wherein said means for shifting said slidable base with respect to said table along a straight line comprises a screw mechanism provided between the slidable base and table.

References Cited in the file of this patent

UNITED STATES PATENTS

| | | |
|---|---|---|
| 1,094,190 | Barth | Apr. 21, 1914 |
| 1,555,530 | Trbojevich | Sept. 29, 1925 |
| 1,633,051 | Trbojevich | June 21, 1927 |

FOREIGN PATENTS

| | | |
|---|---|---|
| 319,173 | Germany | Feb. 27, 1920 |
| 908,880 | France | Oct. 29, 1945 |